United States Patent Office 3,087,906
Patented Apr. 30, 1963

3,087,906
COAGULATING CARBON BLACK-CONTAINING POLYMERIC LATEX BY INCREMENTAL ADDITION OF AN ACID
Richard F. Abbott, Baytown, Tex., assignor to United Rubber & Chemical Company, Baytown, Tex., a corporation of Delaware
No Drawing. Filed Mar. 18, 1960, Ser. No. 15,814
5 Claims. (Cl. 260—41.5)

This invention relates to synthetic rubber latices. More particularly, it relates to the processing of synthetic rubber latices. Still more particularly, it relates to an improved method of coagulating carbon black-synthetic latex masterbatches.

Synthetic rubber latices are prepared, in general, by the emulsion polymerization of a butadiene-1,3 or mixtures thereof, or by the polymerization of a butadiene-1,3 with other compounds polymerizable therewith using any of various polymerization recipes. After the desired degree of conversion is reached, the latex is coagulated and the resultant crumb is subjected to a finishing operation. Coagulation may be practiced in various ways although not necessarily with the same effectiveness in each case. Thus, it is known, for instance, that synthetic latices can be coagulated by the addition thereto of a mineral acid alone, such as dilute sulfuric acid. By such acid coagulation in the absence of an electrolyte such as brine, however, it is generally difficult to control the tack and particle size of the coagulum, with the result that the coagulum is not particularly amenable to treatment in conventional finishing equipment.

In order to reduce these problems, it is common practice to use a salt-acid coagulating system, since salt has been shown to provide the necessary control of tack and particle size. In such a procedure, the salt and acid may be added to the black masterbatch separately or they may be added as a mixture. While there are advantages gained by use of a salt-acid coagulating system, they are accompanied by certain disadvantages. For instance, it has been shown that residual salt in the coagulum adversely affects the heat stability during subsequent processing thereof. The high water soluble ash content of the final product, moreover, seriously affects its quality for certain uses. In addition, the coagulation of a masterbatch highly loaded with high reinforcing carbon black usually results in a coagulum of fine size whether or not a dispersing agent has been employed. Such products prove difficult to process in conventional finishing equipment.

Accordingly, it is a principal object of this invention to provide an improved method of coagulating carbon black-synthetic latex masterbatches which is not subject to the above disadvantages. It is a further object of this invention to provide a method of coagulating such masterbatches by which the tackiness and particle size of the coagulum may be readily controlled. It is also an object of this invention to coagulate black latex masterbatches in such a manner as to produce a coagulum which may be readily treated in conventional finishing equipment. A still further object of this invention is to coagulate latices that are highly loaded with high reinforcing carbon blacks to obtain a tough coagulum of uniform particle size. Another object is to provide a coagulating method which may be efficiently and economically practiced in conventional equipment with a minimum of supervisory control.

According to this invention, these objects are easily and fully met my a simple, yet surprisingly effective and controllable, coagulating method. In view of previous experiences in the coagulation of black-latex masterbatches, however, the results obtained according to the present method are particularly unexpected. In general, the method is similar to known coagulating methods to the extent that it employs an acid coagulating agent. With this generality, however, the similarity ends. Heretofor, when coagulating with acid alone the entire acid requirement for coagulating a particular volume of masterbatch has been added to the latex in one stage. This procedure results in various disadvantages, some of which are mentioned above. On the other hand, it has been reported that if a masterbatch is coagulated in two stages employing a first addition of brine and acetic acid and a second addition of sulfuric acid, a readily processable product may be obtained. However, the coagulum is finely divided. The art is well aware of the problems associated with finely divided coagulum, such as air pollution, difficulties in making both white and black rubber in the same plant, cleaning expense, equipment maintenance and lubrication problems and bad community and labor relations.

The present invention resides in the discovery of a method of producing a coagulum substantially free of fines by treating a particular type of masterbatch, that in which there is a high loading of carbon black, to a coagulation procedure which departs from the above-described procedures in an unobvious manner. According to the present invention, desirable but heretofore difficult to attain coagulum properties are consistently attained by using acid alone, in the absence of salt in the latex, and by the addition of the acid in a plurality of stages or increments to a highly loaded black masterbatch. On completion of acid addition, the coagulum is recovered in the usual manner and processed in conventional finishing equipment.

The method of the present invention is particularly concerned with the coagulation of black-latex masterbatches in which the latex is obtained by the emulsion polymerization of butadiene-1,3 with styreen using a soap type emulsifier such as a rosin acid or fatty acid soap. Nevertheless, it is just as applicable to the coagulation of other masterbatches comprising synthetic latices similarly produced. By the latter is meant those latices formed by the emulsion polymerization of butadiene-1,3 such as butadiene-1,3, methyl-2-butadiene-1,3, chloro-2-butadiene-1,3, piperylene-2,3-dimethyl-butadiene-1,3 and the like as well as mixtures thereof. Also intended to be included are those latices formed by the emulsion polymerization of a butadiene-1,3 with one or more compounds polymerizable therewith containing a terminal $CH_2=C<$ group. Examples of such compounds are aryl olefins, including styrene mentioned above, such as α-methylstyrene, p-chlorostyrene and the like; and the α-methylenecarboxylic acids, their esters and nitriles such as acrylic acid, methylacrylate, methyl methacrylate, acrylonitrile, methacrylonitrile, methylvinyl ether, methylvinyl ketone and the like.

As previously indicated, the present invention applies to the coagulation of black-latex masterbatches having high loadings or carbon black. The method is particularly effective in the treatment of such masterbatches in which the carbon black is a highly reinforcing black, for example, those grades referred to as HAF, SAF and ISAF carbon blacks. Highly loaded styrene-butadiene masterbatches, for instance, containing from 75–100 parts of such black per 100 parts of polymer may be readily coagulated to coagula having a uniform particule size of about ¼″ and substantially free of fines. Coagulation of such highly loaded masterbatches by prior art methods, whether acid or salt-acid, results in coagula of such small particle sizes as to be difficult to recover and treat in conventional equipment. The method, however, is just as applicable to masterbatches comprising other latices containing other grades of carbon black in varying amounts as well as black masterbatches containing extender oils

Example 6

The procedure of Example 1 is repeated using a latex having a bound styrene content of 23.5% emulsion polymerized at 42° F. using a rosin soap. The latex, an aqueous dispersion of HAF carbon black and a dispersion of a highly aromatic processing oil are mixed in proportions such as to provide a final rubber composition comprising 52 parts of black and 10 parts of oil per 100 parts of polymer. Coagulation is conducted in three stages having final pH's of 6.5, 5.5 and 3.0, respectively. After conversion is completed, a coagulum having a uniform particle size of about ¼" is obtained which is readily filtered and dried.

Example 7

The procedure of Example 6 is repeated replacing the styrene-butadiene latex with a butadiene-acrylonitrile latex prepared by emulsion polymerization of 75% butadiene-25% acrylonitrile using a rosin soap emulsifier. On coagulating in two stages with 1% $H_2SO_4$ at pH's of 6.5 and 2.5, a coagulum of uniform particle size is obtained which is easily filtered and dried.

When conducting the coagulation in more than three stages, the incremental pH reductions will naturally be smaller, while for a two stage coagulation, the increments naturally become larger as illustrated. The process is just as applicable to black-latex masterbatches other than those described employing the same or different latices and the same or different carbon blacks.

I claim:

1. A method for coagulating a highly loaded carbon black-bearing synthetic polymer latex of an emulsion polymerizate of a member selected from the class consisting of butadiene and of butadiene with at least one compound containing a terminal $CH_2{=}C{<}$ group and polymerizable therewith which comprises: reducing the pH of said highly loaded carbon black-bearing synthetic polymer latex to about 6.0–7.5 by the addition of a first increment of coagulating acid thereto; further reducing the pH of said latex by the addition of at least one more increment of coagulating acid to produce a particulate highly loaded carbon black-bearing synthetic rubber coagulum of uniform particle size substantially free of fines, said additions of coagulating acid being made in the absence of salt in said latex; and recovering said coagulum.

2. A method according to claim 1 in which the addition of said at least one more increment of coagulating acid reduces the pH to about 2.5–3.5.

3. A method according to claim 1 in which two more increments of coagulating acid are added to first reduce the pH of the latex from 6.0–7.5 to about 4.5–5.5 and then to about 2.5–3.5.

4. A method according to claim 1 in which the polymer is styrene-butadiene.

5. A three stage method of coagulating a carbon black-bearing synthetic polymer latex of an emulsion polymerizate of a member selected from the class consisting of butadiene and butadiene with at least one compound containing a terminal $CH_2{=}C{<}$ group and the polymerizable therewith, said latex containing at least about 75 parts of highly reinforcing carbon black per 100 parts of polymer to obtain a highly loaded, particulate carbon black-bearing coagulum of uniform particle size, substantially free of fines, which comprises: adding a first increment of coagulating acid to the dispersion with agitation and in sufficient quantity to reduce the pH of the dispersion to a value of about 6.0 to 7.5, thus initiating precipitation and formation of nuclei; continuing agitation without begining the second stage of acid addition until the pH of the dispersion reaches a substantially stable value in the aforesaid range; adding a second increment of acid to the dispersion with agitation and in sufficient quantity to reduce the pH thereof to a value of about 4.5 to 5.5, thus densifying said nuclei; continuing agitation without initiating the third stage of acid addition until the pH of the dispersion reaches a substantially stable value in the last-mentioned range; adding a third increment of acid to the dispersion with agitation and in sufficient quantity to reduce the pH of the dispersion to a value of about 2.5 to 3.5, thus converting said densified nuclei to highly loaded carbon black-bearing coagula having a uniform particle size of at least about one-quarter inch and substantially free of fines, all of said acid additions being made in the absence of salt in said dispersion; and recovering said coagulum.

References Cited in the file of this patent

UNITED STATES PATENTS

| | | |
|---|---|---|
| 2,213,321 | McGavack | Sept. 3, 1940 |
| 2,378,732 | Semon et al. | June 19, 1945 |
| 2,385,172 | Vanderbilt et al. | Sept. 18, 1945 |
| 2,393,208 | Waterman et al. | Jan. 15, 1946 |
| 2,527,525 | Breuer | Oct. 31, 1950 |
| 2,915,489 | White | Dec. 1, 1959 |